(12) United States Patent
Miura et al.

(10) Patent No.: US 11,790,706 B2
(45) Date of Patent: Oct. 17, 2023

(54) METHODS AND SYSTEMS FOR CALIBRATING VEHICLE SENSORS

(71) Applicant: Honda Motor Co., Ltd., Tokyo (JP)

(72) Inventors: Hiroshi Miura, Torrance, CA (US); Tatsuya Ippyo, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 651 days.

(21) Appl. No.: 16/668,264

(22) Filed: Oct. 30, 2019

(65) Prior Publication Data

US 2021/0134080 A1   May 6, 2021

(51) Int. Cl.
| | |
|---|---|
| *G07C 5/08* | (2006.01) |
| *B60W 50/00* | (2006.01) |
| *B60W 60/00* | (2020.01) |
| *B60W 30/095* | (2012.01) |

(52) U.S. Cl.
CPC ......... *G07C 5/085* (2013.01); *B60W 30/0956* (2013.01); *B60W 50/00* (2013.01); *B60W 60/0027* (2020.02); *B60W 60/00184* (2020.02); *B60W 2050/0083* (2013.01); *B60W 2554/4044* (2020.02); *B60W 2556/10* (2020.02); *B60W 2556/45* (2020.02)

(58) Field of Classification Search
CPC ....... B60W 60/00184; B60W 60/0027; B60W 30/0956; B60W 2556/10; B60W 2554/4044; B60W 2556/45; B60W 50/00; B60W 2050/0083; G07C 5/085

See application file for complete search history.

(56) References Cited

U.S. PATENT DOCUMENTS

| | | | |
|---|---|---|---|
| 8,692,707 B2* | 4/2014 | Lee | G01S 13/931 342/174 |
| 9,348,017 B2 | 5/2016 | Steinlechner | |
| 9,383,433 B2 | 7/2016 | Doyle | |
| 2008/0204306 A1* | 8/2008 | Shirakawa | G01S 13/589 342/118 |
| 2011/0163894 A1* | 7/2011 | Grievink | G08G 1/042 340/932.2 |
| 2013/0299533 A1 | 11/2013 | Gronewoller et al. | |
| 2015/0070207 A1* | 3/2015 | Millar | G01S 13/4454 342/174 |
| 2016/0350986 A1* | 12/2016 | Oliver | B60W 50/14 |

(Continued)

FOREIGN PATENT DOCUMENTS

| | | | |
|---|---|---|---|
| CN | 103091667 A | * | 5/2013 |
| CN | 103091667 A | | 5/2013 |

(Continued)

*Primary Examiner* — Behrang Badii
*Assistant Examiner* — Jay Khandpur
(74) *Attorney, Agent, or Firm* — Stinson LLP

(57) ABSTRACT

A calibration system calibrates one or more vehicle sensors. The calibration system includes a measuring tool coupleable to a vehicle including the vehicle sensors. The measuring tool generates measurement data associated with a first set of measurements between the measuring tool and a target spaced from the vehicle. The calibration system further includes a line-end tester that compares the measurement data with configuration data associated with a second set of measurements between the measuring tool and the vehicle sensors, and determines one or more aiming parameters associated with the vehicle sensors based on the comparison.

20 Claims, 7 Drawing Sheets

(56) References Cited

U.S. PATENT DOCUMENTS

2017/0259817 A1* 9/2017 Horiguchi ....... B60W 30/18145
2018/0009438 A1* 1/2018 Masui ..................... G08G 1/16

FOREIGN PATENT DOCUMENTS

| CN | 104111058 A | * | 10/2014 | .......... B60W 30/095 |
| CN | 103907242 B | | 9/2017 | |
| DE | 102015005570 A1 | * | 11/2016 | |
| EP | 1376051 B1 | | 1/2008 | |

* cited by examiner

METHODS AND SYSTEMS FOR CALIBRATING VEHICLE SENSORS

BACKGROUND

Some vehicles use sensors to perform various automated operations. An advanced driver assistance system (ADAS), for example, may use vehicle sensors to detect one or more objects around a vehicle and navigate an area accordingly. To promote reliable sensor data, one or more vehicle sensors may be calibrated prior to use. At least some known methods and systems of calibrating vehicle sensors, however, require significant upfront investment in tools and equipment and are complex, tedious, and/or time-consuming. For example, at least some vehicle sensors are calibrated in a controlled environment including an alignment rack, non-glare lighting, and one or more radio wave-absorbing boards placed at predetermined distances around the vehicle.

SUMMARY

Examples of this disclosure facilitate calibrating one or more vehicle sensors. In one aspect, a method is provided for calibrating one or more vehicle sensors. The method includes coupling a measuring tool to a vehicle including the vehicle sensors, using the measuring tool to generate measurement data associated with a first set of measurements between the measuring tool and a target spaced from the vehicle, and comparing the measurement data with configuration data associated with a second set of measurements between the measuring tool and the vehicle sensors to determine one or more aiming parameters.

In another aspect, a calibration system is provided for calibrating one or more vehicle sensors. The calibration system includes a measuring tool coupleable to a vehicle including the vehicle sensors. The measuring tool generates measurement data associated with a first set of measurements between the measuring tool and a target spaced from the vehicle. The calibration system further includes a line-end tester that compares the measurement data with configuration data associated with a second set of measurements between the measuring tool and the vehicle sensors, and determines one or more aiming parameters associated with the vehicle sensors based on the comparison.

In yet another aspect, a system is provided. The system includes one or more targets, a vehicle comprising one or more sensors that generate sensor data associated with the targets and a vehicle controller coupled to the sensors, a measuring tool that is coupleable to the vehicle and generates measurement data associated with a first set of measurements between the measuring tool and a target spaced from the vehicle, and a line-end tester that compares the measurement data with configuration data associated with a second set of measurements between the measuring tool and the vehicle sensors and determines one or more aiming parameters associated with the vehicle sensors based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Examples described below will be more clearly understood when the detailed description is considered in conjunction with the accompanying drawings, in which.

Figure 1:
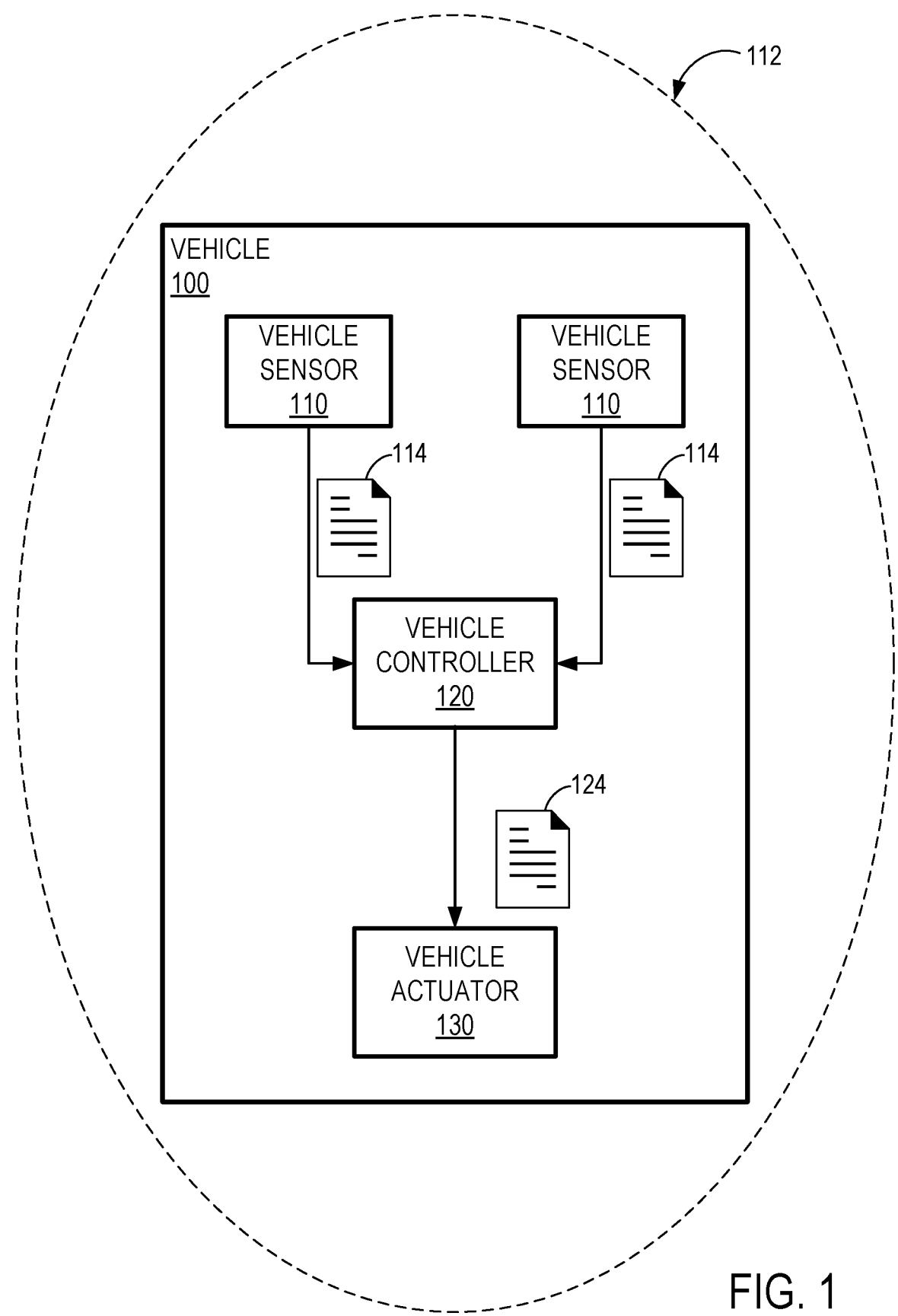
FIG. 1 is a block diagram of an example vehicle.

It should be noted that these drawings are intended to illustrate the general characteristics of methods, structures, and/or materials utilized in the examples and to supplement the written description provided below. These drawings are not, however, to scale and may not precisely reflect the precise structural or performance characteristics of any given example, and should not be interpreted as defining or limiting the range of values or properties encompassed by the examples.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to vehicles and, more particularly, to methods and systems for calibrating vehicle sensors. Vehicle sensors allow vehicles to understand its environment and perform one or more operations with little or no human input. Sensor data, for example, may be processed and/or interpreted to identify one or more routes to a destination. Examples described herein generate trusted data that may be used to calibrate one or more vehicle sensors efficiently and effectively. Other benefits and advantages will become clear from the disclosure provided herein, and those advantages provided are for illustration.

The systems and processes described herein may be implemented using computer programming or engineering techniques including computer software, firmware, hardware or a combination or subset thereof. The technical effect of the systems and processes described herein is achieved by performing at least one of the following operations: a) generating measurement data associated with a first set of measurements between a measuring tool and a target spaced from the vehicle; b) comparing measurement data with configuration data associated with a second set of measurements between the measuring tool and one or more vehicle sensors; and/or c) determining one or more aiming parameters associated with the vehicle sensors.

FIG. 1 shows an example vehicle 100. The vehicle 100 includes a plurality of vehicle sensors 110 that may be used to monitor an environment 112 of the vehicle 100. The vehicle sensors 110 may generate one or more signals or sensor data 114, for example, based on one or more stimuli detected by the vehicle sensors 110. Example vehicle sensors 110 include, without limitation, a microphone, an electrostatic sensor, a piezoelectric sensor, a camera, an image sensor, a photoelectric sensor, an infrared sensor, an ultrasonic sensor, a microwave sensor, a magnetometer, a motion sensor, a receiver, a transceiver, and any other device configured to detect a stimulus in the vehicle 100 and/or environment 112. While the vehicle 100 is described and shown to include two vehicle sensors 110, the vehicle 100 described herein may include any quantity of vehicle sensors 110.

In some examples, the vehicle sensors 110 transmit or provide sensor data 114 to a vehicle controller 120 for processing. The sensor data 114 may be processed, for example, using a haversine formula, a Kalman filter, a particle filter, a simultaneous localization and mapping ("SLAM") algorithm, and the like. In some examples, the vehicle controller 120 processes sensor data 114 to convert the sensor data 114 into one or more other forms (e.g., an analog signal to a digital form), to remove at least some undesired portions ("noise"), and/or to recognize or identify one or more objects in the environment 112. Sensor data 114 may include any information that enables a computing device (e.g., vehicle controller 120) to map or understand the environment 112 and/or various objects in the environment 112.

In some examples, the vehicle controller 120 may use one or more annotations or identifiers that allow one or more objects, or one or more characteristics of an object, to be readily recognized or identified. The vehicle controller 120 may classify or identify an object (e.g., a building, a landmark) as a static object, for example, if a position and/or orientation of the object is the same or substantially similar over time (e.g., based on sensor data 114 associated with a first point in time and sensor data 114 associated with a second point in time). Additionally or alternatively, the vehicle controller 120 may classify or identify an object (e.g., a vehicle, a pedestrian) as a dynamic object, for example, if a position and/or orientation of the object changes over time. In some examples, the vehicle controller 120 monitors or tracks dynamic objects by collecting data indicative of a level of activity or movement (e.g., maximum speed, average speed, direction), as well as behavior patterns. In this manner, the vehicle controller 120 may predict or determine a position and/or orientation of dynamic objects.

The vehicle controller 120 may use the sensor data 114 to generate control data 124. Control data 124 may include information that enables a computing device (e.g., vehicle controller 120) to control or operate some aspect of the vehicle 100. Control data 124 may be used, for example, to provide forward collision warning, automatic emergency braking, adaptive cruise control, lane departure warning, lane keeping assist, blind spot monitoring, rear cross traffic alert, parking assist, automated parking, adaptive headlights, and/or automated headlight control.

In some examples, the vehicle controller 120 may transmit or provide control data 124 to one or more vehicle actuators 130, for example, for steering, accelerating, and/or braking the vehicle 100. The control data 124 may also allow an occupant of the vehicle 100 (e.g., a driver) to control or operate the vehicle 100. While the vehicle 100 is described and shown to include one vehicle actuator 130, the vehicle 100 described herein may include any quantity of vehicle actuators 130.

Figure 2:
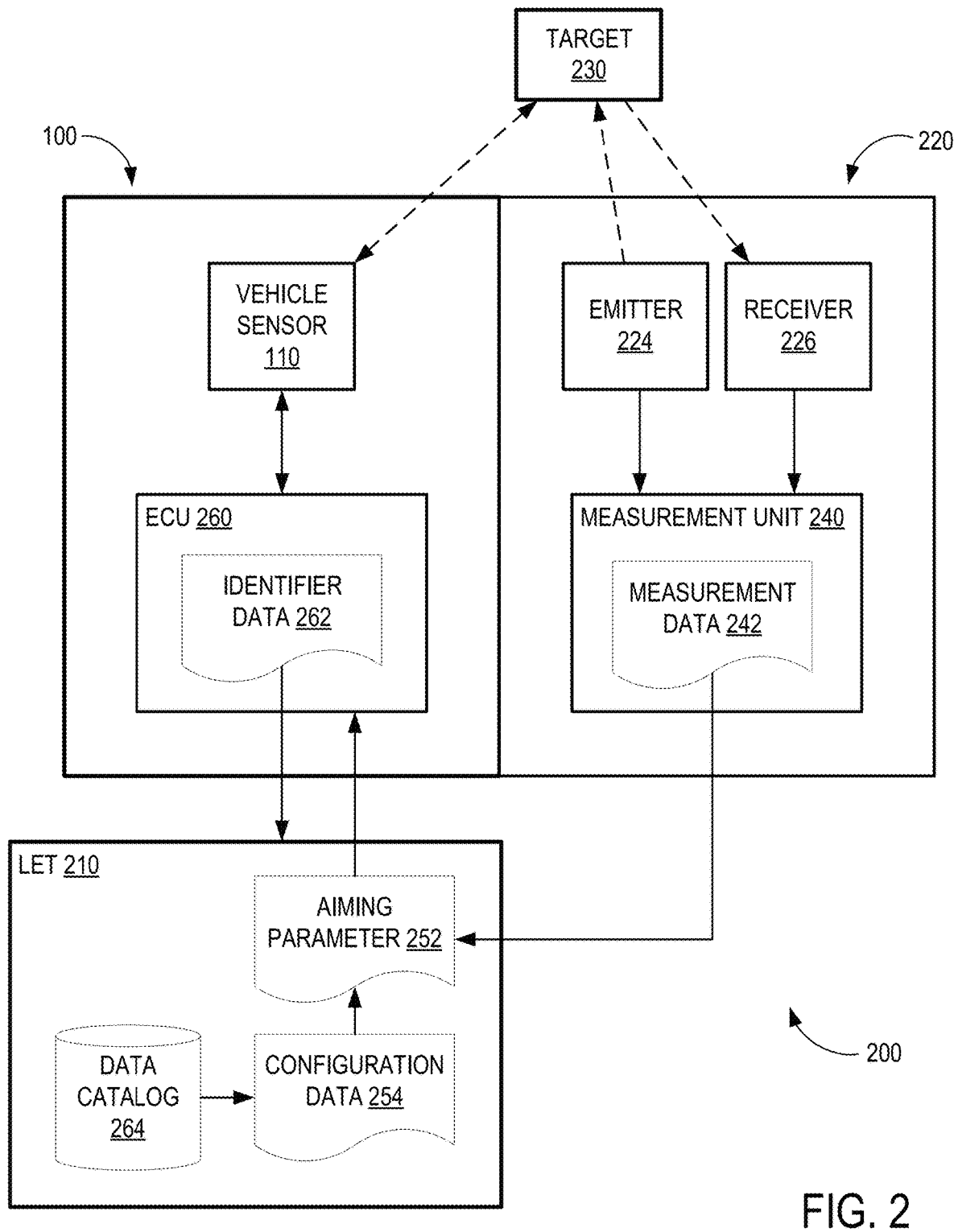
FIGS. 2 and 3 are schematic diagrams of an example calibration system that may be used to calibrate one or more sensors, such as a vehicle sensor of the vehicle shown in FIG. 1.
Figure 3:
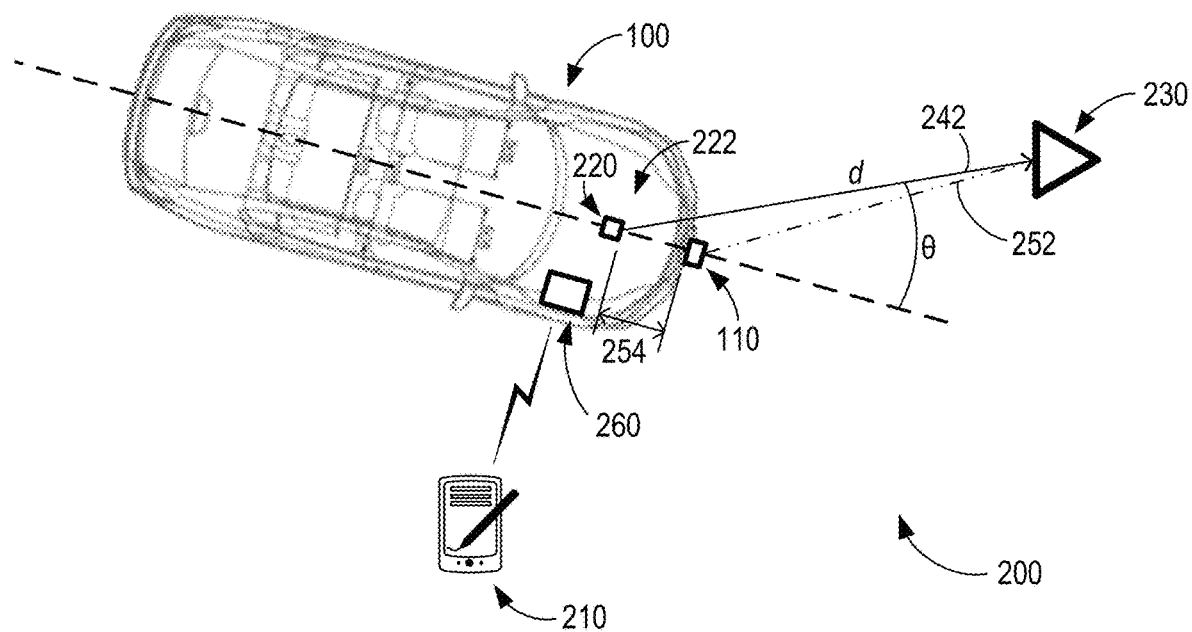

FIGS. 2 and 3 show an example calibration system 200 that may be used to calibrate one or more vehicle sensors 110. In some examples, the calibration system 200 includes a line-end tester (LET) 210 configured to perform one or more inspections and a measuring tool 220 that provides the LET 210 with trusted or reliable information. As shown in FIG. 3, the measuring tool 220 may be coupled to a hood 222 of a vehicle 100 including the vehicle sensors 110. Alternatively, the measuring tool 220 may be coupled to any portion of the vehicle 100 that allows the measuring tool 220 to be positioned relative to the vehicle sensors 110 in a consistent, predictable manner (e.g., in the same or similar position relative to the vehicle sensors 110 each time the measuring tool 220 is coupled to the vehicle 100).

The measuring tool 220 includes an emitter 224 configured to emit one or more signals (e.g., laser pulses), and/or a receiver 226 configured to receive one or more signals (e.g., reflections of the laser pulses). Signals may be emitted toward and/or received from one or more targets 230 spaced from the vehicle 100. In some examples, the measuring tool 220 includes a measurement unit 240 that processes the signals emitted from the emitter 224 and/or received at the receiver 226 to generate measurement data 242. Signals may be processed, for example, to recognize or identify one or more objects (e.g., targets 230) and/or to determine or calculate a distance measurement (e.g., d) and an angle measurement (e.g., θ) between a first object (e.g., measuring tool 220, emitter 224, receiver 226) and a second object (e.g., target 230).

As shown at FIG. 3, the angle measurement may be taken relative to a local reference, such as a longitudinal axis of the vehicle 100. Alternatively, the distance and/or angle measurement may be mapped in any coordinate system that enables the measuring tool 220 to function as described herein. While the measuring tool 220 is described and shown to utilize laser pulses to detect objects and/or determine distances and angles (e.g., using lidar technology), the measuring tool 220 described herein, as well as the vehicle sensors 110, may utilize any technology that enables a computing device (e.g., emitter 224, receiver 226, measurement unit 240) to map or understand the environment 112 (shown in FIG. 1) and/or various objects in the environment 112.

Measurement data 242 may be used to calculate or determine one or more aiming parameters 252 for calibrating the vehicle sensors 110. Aiming parameters 252 may be used, for example, to locate and/or identify one or more targets 230 using the vehicle sensors 110. The aiming parameters 252 may include or be associated with a distance measurement and an angle measurement between a third object (e.g., vehicle sensor 110) and the second object (e.g., target 230).

In some examples, the LET 210 determines the aiming parameters 252 by assessing the measurement data 242 in light of configuration data 254. Configuration data 254 may include or be associated with, for example, a position and/or orientation of the vehicle sensors 110 relative to a position and/or orientation of the measuring tool 220 (e.g., when the measuring tool 220 is coupled to the vehicle 100). In some examples, the LET 210 analyzes the configuration data 254 to calculate or determine a distance measurement and an angle measurement between the first object (e.g., measuring tool 220, emitter 224, receiver 226) and the third object (e.g., vehicle sensor 110). The LET 210 may convert measurement data 242 and/or configuration data 254 between different coordinate systems. For example, the LET 210 may align the measurement data 242 and/or configuration data 254 such that the measurement data 242 and configuration data 254 are mapped in a common coordinate system (e.g., measurement data 242 and configuration data 254 have the same frame of reference).

In some examples, the LET 210 communicates with an electronic control unit (ECU) 260 (e.g., vehicle controller 120) to identify or obtain configuration data 254 associated with one or more vehicle sensors 110. For example, the LET 210 may prompt the ECU 260 for information by transmitting a request to the ECU 260, and, in response, the ECU 260 may transmit configuration data 254 to the LET 210. Alternatively, the ECU 260 may provide the LET 210 with identifier data 262 that enables the LET 210 to identify or obtain configuration data 254 corresponding to the identifier data 262. For example, as shown in FIG. 2, the LET 210 may use identifier data 262 to select or identify configuration data 254 from a data catalog 264. Identifier data 262 may include, without limitation, a year, a make, a model, a trim level, a style, and/or an option of the vehicle 100.

Figure 4:
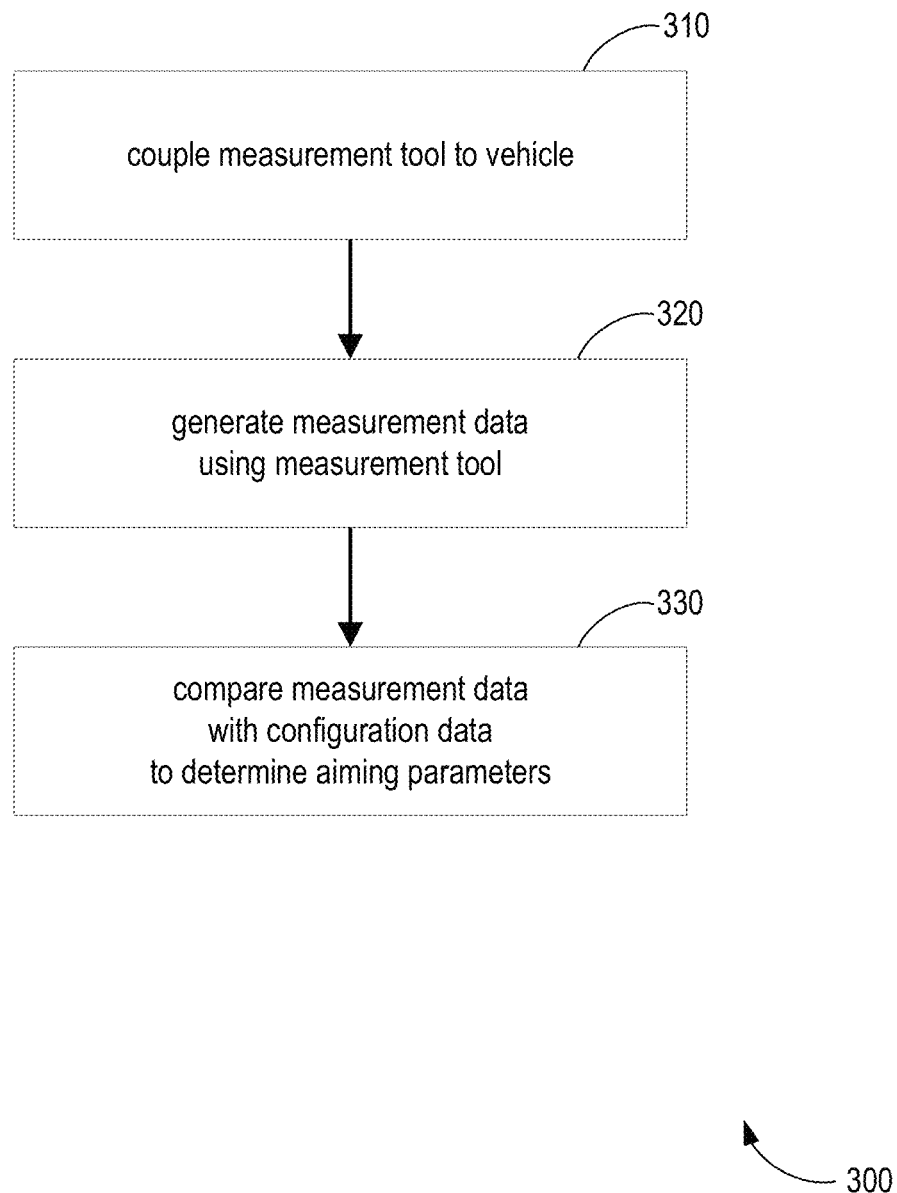
FIG. 4 is a flowchart of an example method for using the calibration system shown in FIG. 2.
Figure 5:
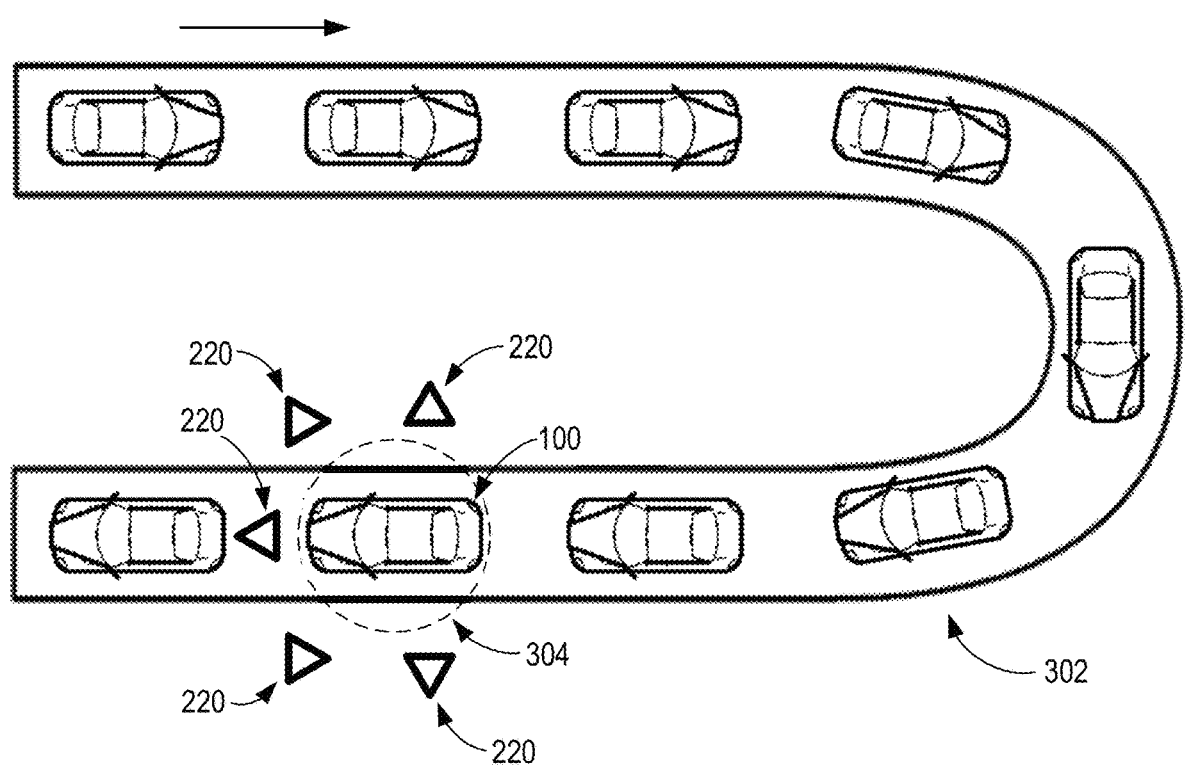
FIG. 5 is a schematic diagram of an example inspection line that may be used to inspect one or more vehicles, such as the vehicle shown in FIG. 1.
Figure 6:
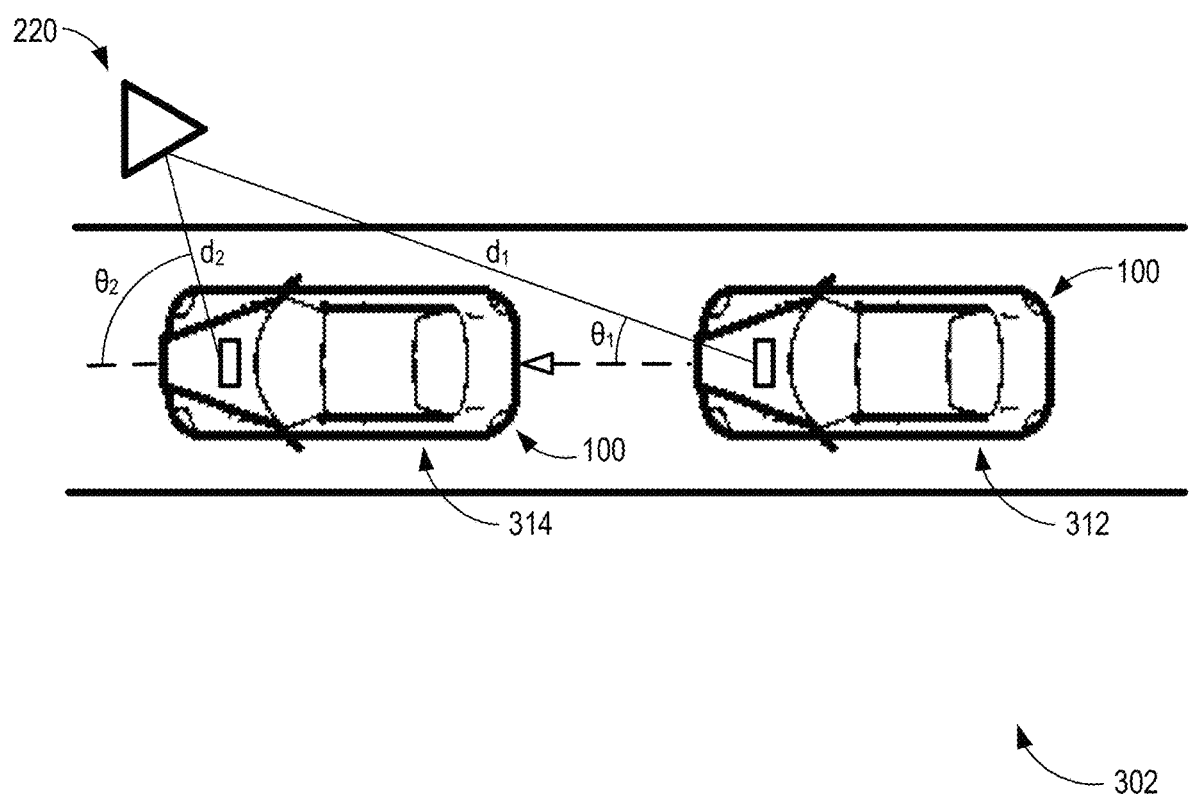
FIG. 6 is a detailed schematic diagram of an example vehicle in the inspection line shown in FIG. 5.

FIG. 4 shows an example method 300 for calibrating one or more vehicle sensors 110 (shown in FIG. 1). Vehicle sensors 110 may be tested or inspected, for example, as a part of a manufacturing or production process. For example, as shown at FIGS. 5 and 6, one or more vehicles 100 may be moved along an inspection line 302, and vehicle sensors 110 may be calibrated when a corresponding vehicle 100 is at a predetermined inspection position 304. Alternatively, vehicle sensors 110 may be tested or inspected as a part of a maintenance or repair process.

One or more operations of the method 300 may be implemented using a calibration system 200 (shown in FIGS. 2 and 3). In some examples, the measuring tool 220 is coupled to the vehicle 100 at operation 310. As shown at FIG. 2, the measuring tool 220 may be removably coupled to the hood 222 of the vehicle 100 and facing forward (e.g., in the direction of typical travel). Alternatively, any portion of the measuring tool 220 (e.g., emitter 224, receiver 226) may be coupled to any portion of the vehicle 100 that allows the calibration system 200 to function as described herein. In some examples, the measurement unit 240 is communicatively coupled to an on-board diagnostics coupler of the vehicle 100.

The measuring tool 220 and/or an LET 210 coupled to the measuring tool 220 may be used to determine whether the vehicle 100 is at a predetermined inspection position 304 (e.g., in the inspection line 302). As shown at FIG. 5, a plurality of targets 230 may be positioned about the inspection position 304 for taking a plurality of distance and/or angle measurements between one or more first objects (e.g., measuring tool 220, emitter 224, receiver 226) and one or more second objects (e.g., target 230).

In some examples, the measuring tool 220 transmits and/or receives one or more signals to take measurements on one or more occurrences as the vehicle 100 is moved along the inspection line 302. For example, as shown at FIG. 6, a first distance measurement (e.g., $d_1$) and a first angle measurement (e.g., $\theta_1$) may be taken when the vehicle 100 is in a first position 312, and a second distance measurement (e.g., $d_2$) and a second angle measurement (e.g., $\theta_2$) may be taken when the vehicle 100 is in a second position 314. If the measurements associated with a particular occurrence satisfy a predetermined threshold (e.g., each distance and/or angle measurement is within a predetermined range), then the vehicle 100 may be determined to be at the inspection position 304, and measurement data 242 may be generated based on the distance and/or angle measurements. If, on the other hand, the measurements associated with an occurrence do not satisfy the predetermined threshold (e.g., at least one distance and/or angle measurement is not within the predetermined range), then the vehicle 100 may be determined to be at a location other than the inspection position 304.

When the vehicle 100 is at the predetermined inspection position 304, the measuring tool 220 may be used at operation 320 to generate measurement data 242 associated with a first set of measurements between the measuring tool 220 and one or more targets 230 spaced from the vehicle 100. For example, the emitter 224 may transmit one or more signals towards a target 230, and/or the receiver 226 may receive one or more reflections of the signals from the target 230. In some examples, the first set of measurements includes a measure of magnitude (e.g., d) and a measure of direction (e.g., $\theta$) between the measuring tool 220 and the target 230 (e.g., a first distance and angle measurement).

The LET 210 may be used to determine one or more aiming parameters 252 at operation 330 by comparing the measurement data 242 with configuration data 254 associated with a second set of measurements between the measuring tool 220 and the vehicle sensors 110. In some examples, the second set of measurements includes a measure of magnitude (e.g., d) and a measure of direction (e.g., $\theta$) between the measuring tool 220 and the vehicle sensors 110 (e.g., a second distance and angle measurement). If the measurement data 242 and configuration data 254 are not mapped in a common coordinate system, the LET 210 may convert the measurement data 242 and/or configuration data 254 such that the measurement data 242 and configuration data 254 are mapped in a common coordinate system. In some examples, the configuration data 254 is determined based on identifier data 262 associated with the vehicle 100 and/or vehicle sensors 110. For example, the LET 210 may communicate with the vehicle 100 (e.g., via vehicle controller 120 or ECU 260) to identify the vehicle 100 and/or vehicle sensors 110, and obtain configuration data 254 associated with the vehicle 100 and/or vehicle sensors 110.

The LET 210 may transmit one or more aiming parameters 252 to the vehicle sensors 110, vehicle controller 120, and/or ECU 260 to carry out or implement the aiming parameters 252. Aiming parameters 252 may be used, for example, to increase or improve a functionality of the vehicle sensors 110. In some examples, the LET 210 generates a test instruction, and transmits the test instruction to the vehicle sensors 110, vehicle controller 120, and/or ECU 260 for generating sensor data 114 using the vehicle sensors 110. Additionally or alternatively, the LET 210 may generate an adjust instruction, and transmit the adjust instruction to the vehicle sensors 110, vehicle controller 120, and/or ECU 260. The adjust instruction may be implemented, for example, to digitally adjust sensor data 114 and/or to physically adjust a position and/or orientation of one or more vehicle sensors 110.

In this manner, the calibration system 200 may be used to generate trusted data (e.g., measurement data 242) and use the trusted data as a standard or benchmark for orienting configuration data 254 and/or calibrating the vehicle sensors 110. Aspects of the disclosure provide for a computing system that performs one or more operations in an environment including a plurality of devices coupled to each other via a network (e.g., a local area network (LAN), a wide area network (WAN), the Internet). In some examples, the LET 210, measurement unit 240, and/or ECU 260 communicate with each other to analyze sensor data 114, measurement data 242, aiming parameters 252, configuration data 254, and/or identifier data 262 for use in calibrating the vehicle sensors 110.

Figure 7:
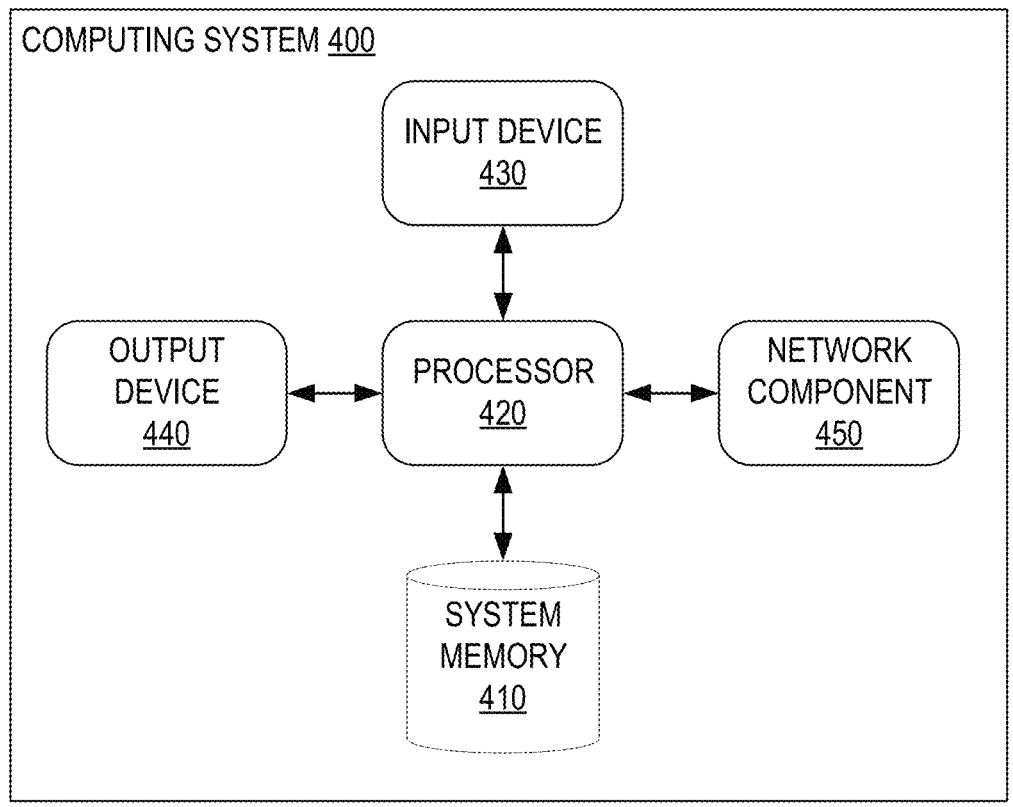
FIG. 7 is a block diagram of an example computing system that may be used to calibrate one or more sensors, such as a vehicle sensor of the vehicle shown in FIG. 1.

FIG. 7 shows an example computing system 400 configured to perform one or more computing operations. While some examples of the disclosure are illustrated and described herein with reference to the computing system 400 being included in a vehicle controller 120 (shown in FIG. 1), LET 210 (shown in FIG. 2), measurement unit 240 (shown in FIG. 2), and/or ECU 260 (shown in FIG. 2), aspects of the disclosure may be operable with any computing system (e.g., vehicle sensor 110, vehicle actuator 130, emitter 224, receiver 226) that executes instructions to implement the operations and functionality associated with the computing system 400. The computing system 400 shows only one example of a computing environment for performing one or more computing operations and is not intended to suggest any limitation as to the scope of use or functionality of the disclosure.

In some examples, the computing system 400 may include a system memory 410 and a processor 420 coupled to the system memory 410. The system memory 410 may store data associated with the vehicle 100, LET 210, measuring tool 220, and/or target 230, and computer-executable instructions, and the processor 420 is programmed or configured to execute the computer-executable instructions for implementing aspects of the disclosure using the vehicle controller 120, LET 210, measurement unit 240, and/or ECU 260. The system memory 410 may include one or more computer-readable media that allow information, such as the computer-executable instructions and other data, to be stored and/or retrieved by the processor 420. For example, at least some data may be associated with one or more objects, sensors, and/or control mechanisms such that the computer-executable instructions enable the processor 420 to manage or control one or more operations of the vehicle controller 120, LET 210, measurement unit 240, and/or ECU 260.

By way of example, and not limitation, computer-readable media may include computer storage media and communication media. Computer storage media are tangible and mutually exclusive to communication media. For example, the system memory 410 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 420. Computer storage media may be implemented in hardware and exclude carrier waves and propagated signals. That is, computer storage media for purposes of this disclosure are not signals per se.

In some examples, the processor 420 executes the computer-executable instructions to analyze vehicle data to generate measurement data, generate environment data, compare a sensed target position associated with the environment data with a measured target position associated with the measurement data to identify one or more differences between the sensed target position and the measured target position, and/or determine one or more aiming parameters associated with the vehicle sensors based on the differences. In this manner, one or more vehicle sensors 110 may be calibrated and/or used in an efficient, cost-effective manner. The processor 420 may include one or more processing units (e.g., in a multi-core configuration). Although the processor 420 is shown separate from the system memory 410, examples of the disclosure contemplate that the system memory 410 may be onboard the processor 420, such as in some embedded systems.

A user may enter commands and other input into the computing system 400 through one or more input devices 430 coupled to the processor 420. The input devices 430 are configured to receive information (e.g., from the user). Example input devices 430 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 440 coupled to the processor 420. The output devices 440 are configured to convey information (e.g., to the user). Example, output devices 440 include, without limitation, a monitor, a projector, a printer, a speaker, a vibrating component. In some examples, an output device 440 is integrated with an input device 430 (e.g., a capacitive touchscreen panel, a controller including a vibrating component).

One or more network components 450 may be used to operate the computing system 400 in a networked environment using one or more logical connections. Logical connections include, for example, local area networks and wide area networks (e.g., the Internet). The network components 450 allow the processor 420, for example, to convey information to and/or receive information from one or more remote devices, such as another computing system or one or more remote computer storage media. Network components 450 may include a network adapter, such as a wired or wireless network adapter or a wireless data transceiver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Example calibration systems are described herein and illustrated in the accompanying drawings. This written description uses examples to disclose aspects of the disclosure and also to enable a person skilled in the art to practice the aspects, including making or using the above-described systems and executing or performing the above-described methods. One purpose of the example calibration systems described herein is to use known or measured vector and/or position information regarding one or more objects (e.g., target 230) to calibrate one or more sensors (e.g., vehicle sensors 110). In this manner, aiming and/or calibration of vehicle sensors 110 may be performed efficiently and effectively.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, other automated systems.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of calibrating one or more vehicle sensors of a vehicle, the method comprising:
   physically coupling a measuring tool to a portion of the vehicle, the measuring tool configured to generate a distance measurement between the measuring tool and a target spaced from the vehicle and an angle measurement between the measuring tool and the target spaced from the vehicle;
   using the measuring tool to generate measurement data, the measurement data associated with a first set of measurements including the distance measurement between the measuring tool and a target spaced from the vehicle and the angle measurement between the measuring tool and the target spaced from the vehicle;
   comparing the measurement data with configuration data to determine one or more aiming parameters, the configuration data associated with a second set of measurements including a distance measurement between the measuring tool and the one or more vehicle sensors and an angle measurement between the measuring tool and the one or more vehicle sensors; and
   transmitting the one or more aiming parameters to one or more of the one or more vehicle sensors or a controller coupled to the one or more sensors for use in calibrating the one or more vehicle sensors.

2. The method of claim 1, wherein using the measuring tool further comprises transmitting one or more signals towards the target and receiving one or more reflections of the one or more signals from the target.

3. The method of claim 1, wherein using the measuring tool further comprises taking a first distance measurement and a first angle measurement when the vehicle is in a first position and taking a second distance measurement and a second angle measurement when the vehicle is in a second position.

4. The method of claim 1, wherein using the measuring tool further comprises determining whether the vehicle is at a predetermined inspection position.

5. The method of claim 1, further comprising determining the configuration data based on identifier data associated with the vehicle.

6. The method of claim 1, further comprising analyzing the configuration data to determine the second set of measurements.

7. The method of claim 1, wherein comparing the measurement data with the configuration data further comprises converting one or more of the measurement data or the configuration data such that the measurement data and the configuration data are mapped in a common coordinate system.

8. The method of claim 1, further comprising generating a test instruction to generate sensor data using the one or more vehicle sensors.

9. The method of claim 1, further comprising adjusting one or more of a position or an orientation of the one or more vehicle sensors.

10. The method of claim 1, further comprising adjusting the sensor data.

11. A calibration system for use in calibrating one or more vehicle sensors of a vehicle, the calibration system comprising:
   a measuring tool physically coupleable to a portion of the vehicle, the measuring tool configured to generate measurement data associated with a first set of measurements including a distance measurement between the measuring tool and a target spaced from the vehicle and an angle measurement between the measuring tool and the target spaced from the vehicle; and
   a line-end tester configured to compare the measurement data with configuration data, determine one or more aiming parameters, and transmit the one or more aiming parameters to one or more of the one or more vehicle sensors or a controller coupled to the one or more vehicle sensors for use in calibrating the one or more vehicle sensors based on the comparison, the configuration data associated with a second set of measurements including a distance measurement between the measuring tool and the one or more vehicle sensors and an angle measurement between the measuring tool and the one or more vehicle sensors.

12. The calibration system of claim 11, wherein the measuring tool takes a first distance measurement and a first angle measurement when the vehicle is in a first position and takes a second distance measurement and a second angle measurement when the vehicle is in a second position.

13. The calibration system of claim 11, wherein the line-end tester determines the configuration data based on identifier data associated with the vehicle.

14. The calibration system of claim 11, wherein the line-end tester analyzes the configuration data to determine the second set of measurements.

15. The calibration system of claim 11, wherein the line-end tester converts one or more of the measurement data or the configuration data such that the measurement data and the configuration data are mapped in a common coordinate system.

16. A system comprising:
   one or more targets;
   a vehicle comprising one or more sensors configured to generate sensor data associated with the one or more targets and a vehicle controller coupled to the one or more sensors;
   a measuring tool physically coupleable to a portion of the vehicle, the measuring tool configured to generate measurement data associated with a first set of measurements including a distance measurement between the measuring tool and a target spaced from the vehicle and an angle measurement between the measuring tool and the target spaced from the vehicle; and a line-end tester configured to compare the measurement data with configuration data, determine one or more aiming parameters, and transmit the one or more aiming parameters to one or more of the one or more vehicle sensors or the vehicle controller for use in calibrating the one or more vehicle sensors based on the comparison, the configuration data associated with a second set of measurements including a distance measurement between the measuring tool and the one or more vehicle sensors and an angle measurement between the measuring tool and the one or more vehicle sensors.

17. The system of claim 16, wherein the measuring tool transmits one or more first signals towards the target and receives one or more first reflections of the one or more first signals from the target when the vehicle is in a first position, and transmits one or more second signals towards the target and receives one or more second reflections of the one or more second signals from the target when the vehicle is in a second position.

18. The system of claim 16, wherein the line-end tester determines the configuration data based on identifier data associated with the vehicle.

19. The system of claim 16, wherein the line-end tester analyzes the configuration data to determine the second set of measurements, and converts one or more of the measurement data or the configuration data such that the measurement data and the configuration data are mapped in a common coordinate system.

20. The system of claim 16, wherein the line-end tester generates an adjust instruction to adjust one or more of the sensor data, a position of the one or more vehicle sensors, or an orientation of the one or more vehicle sensors.

* * * * *